United States Patent
Jeon et al.

(10) Patent No.: US 10,551,648 B2
(45) Date of Patent: Feb. 4, 2020

(54) SWITCHABLE LIQUID CRYSTAL DISPLAY DEVICE

(71) Applicant: LG Display Co., Ltd., Seoul (KR)

(72) Inventors: Ji-Na Jeon, Paju-si (KR); Min-Geun Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/672,101

(22) Filed: Aug. 8, 2017

(65) Prior Publication Data

US 2018/0059451 A1 Mar. 1, 2018

(30) Foreign Application Priority Data

Aug. 31, 2016 (KR) .......... 10-2016-0112175

(51) Int. Cl.
| | |
|---|---|
| *G02F 1/13* | (2006.01) |
| *G02B 5/30* | (2006.01) |
| *G02B 27/28* | (2006.01) |
| *G02F 1/1335* | (2006.01) |
| *G02F 1/1343* | (2006.01) |

(52) U.S. Cl.
CPC ......... *G02F 1/1323* (2013.01); *G02B 5/3083* (2013.01); *G02B 27/28* (2013.01); *G02F 1/1343* (2013.01); *G02F 1/133528* (2013.01)

(58) Field of Classification Search
CPC ............. G02F 1/1323; G02F 1/133528; G02F 1/1343; G02F 1/13471; G02F 1/1334; G02B 5/3083; G02B 27/28
See application file for complete search history.

(56) References Cited

U.S. PATENT DOCUMENTS

| | | | | |
|---|---|---|---|---|
| 2007/0268427 | A1* | 11/2007 | Uehara ................ | G02B 6/0016 349/62 |
| 2012/0113362 | A1* | 5/2012 | Lim ..................... | G02F 1/1323 349/96 |
| 2014/0232960 | A1* | 8/2014 | Schwartz ............. | G02B 26/004 349/12 |
| 2017/0219859 | A1* | 8/2017 | Christophy ........... | G02F 1/1323 |

* cited by examiner

*Primary Examiner* — Nathanael R Briggs
(74) *Attorney, Agent, or Firm* — Seep IP Law Group LLP

(57) ABSTRACT

The present disclosure relates to a switchable liquid crystal display device having a light weight and a thin profile where a viewing angle adjusting panel is formed by using a liquid crystal capsule having an optical isotropy and a number of substrates and polarizing plates.

14 Claims, 7 Drawing Sheets

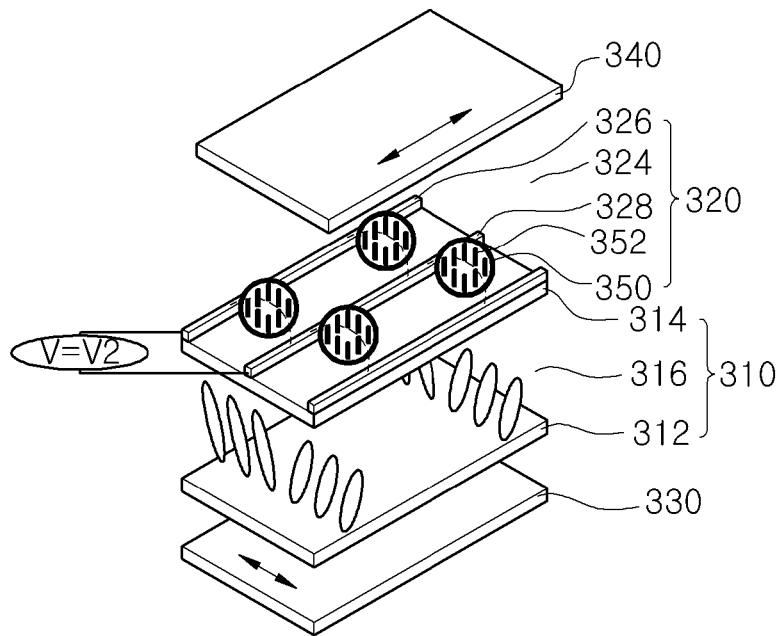
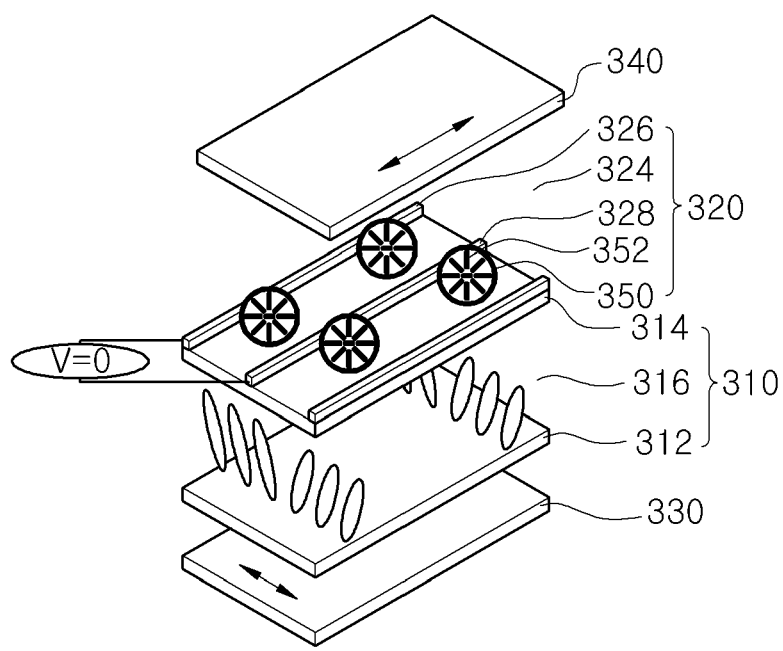

SWITCHABLE LIQUID CRYSTAL DISPLAY DEVICE

CROSS-REFERENCE TO RELATED APPLICATIONS

This application claims the benefit under 35 U.S.C. § 119(a) of Korean Patent Application No. 2016-0112175, filed on Aug. 31, 2016, in the Korean Intellectual Property Office, which is incorporated herein by reference in its entirety.

BACKGROUND

Technical Field

The present disclosure relates to a liquid crystal display device, and more particularly, to a switchable liquid crystal display device where an operation mode switches between a wide viewing angle and a narrow viewing angle.

Discussion of the Related Art

A liquid crystal display (LCD) device has been widely used for a television and a monitor due to its superior moving image display capability and high contrast ratio. The LCD device displays an image using an optical anisotropy and a polarization property of a liquid crystal molecule.

The LCD device includes a liquid crystal panel having two substrates and a liquid crystal layer between the two substrates. The LCD device displays an image using a transmittance difference due to a change in an alignment direction of a liquid crystal molecule by an electric field in the liquid crystal panel.

A viewing angle property of the LCD device is very important to watch a screen at various angles. The LCD device is required to display an image that is clear and is not distorted in a relatively wide viewing angle range, and a wide viewing angle technology has been developed.

As a result, an in-plane switching mode LCD device where a wide viewing angle is obtained by driving the liquid crystal layer with a horizontal electric field has been suggested.

The LCD device has been used for a screen of a portable equipment such as a personal terminal, a portable computer and a portable phone, and the portable equipment may be used in a public place.

When the electronic equipment is used in a public place, it may be desired that a content of the screen be shown to only a user and not be shown to another person adjacent to the user.

As a result, a narrow viewing angle mode is required, where an image of the screen is shown to only a person at a front angle of the screen and a privacy of a secret document or a security document is kept, as well as a wide viewing angle mode.

FIGS. 1A and 1B are perspective view showing a wide viewing angle mode and a narrow viewing angle mode, respectively, of a switchable liquid crystal display device according to the related art.

In FIGS. 1A and 1B, a switchable liquid crystal display (LCD) device according to the related art includes a first liquid crystal panel 10 displaying an image of a wide viewing angle, a second liquid crystal panel 20 displaying an image of one of a wide viewing angle and a narrow viewing angle, a first polarizing plate 30 under the first liquid crystal panel 10, a retardation film 40 and a second polarizing plate 50 between the first and second liquid crystal panels 10 and 20 and a third polarizing plate 60 over the second liquid crystal panel 20.

The first liquid crystal panel 10 includes first and second substrates 12 and 14 facing and spaced apart from each other and a first liquid crystal layer 16 between the first and second substrates 12 and 14, and the second liquid crystal panel 20 includes third and fourth substrates 22 and 24 facing and spaced apart from each other and a second liquid crystal layer 26 between the third and fourth substrates 22 and 24.

A transmission axis of the first polarizing plate 30 is perpendicular to transmission axes of the second and third polarizing plates 50 and 60, and the transmission axis of the second polarizing plate 50 is parallel to the transmission axis of the third polarizing plate 60.

The first liquid crystal layer 16 of the first liquid crystal panel 10 has a vertical alignment, and the second liquid crystal layer 26 of the second liquid crystal panel has a horizontal alignment.

In a wide viewing angle mode illustrated in FIG. 1A, since a voltage is not applied to electrodes (not shown) of the third and fourth substrates 22 and 24 of the second liquid crystal panel 20 and an electric field is not generated, a liquid crystal molecule of the second liquid crystal layer 26 maintains an initial state of the horizontal alignment. As a result, a light passes through the first liquid crystal panel 10 and the second polarizing plate 50 to become a polarized light having a wide viewing angle property and a polarization axis parallel to the transmission axis of third polarizing plate 60, and the polarized light intactly passes through the second liquid crystal panel 20 and the third polarizing plate 60 along all of viewing angles. Accordingly, the switchable LCD device displays an image with a wide viewing angle property.

In a narrow viewing angle mode illustrated in FIG. 1B, since a voltage V1 is applied to the electrodes of the third and fourth substrates 22 and 24 of the second liquid crystal panel 20 and a vertical electric field is generated, the liquid crystal molecule of the second liquid crystal layer 26 is realigned along a vertical direction. As a result, the switchable LCD device displays an image with a narrow viewing angle property due to an electrically controlled birefringence (ECB) property where a transmittance changes according to an angle between a long axis of a liquid crystal molecule and a transmission axis of a polarizing plate.

Since the second liquid crystal panel 20 switches the viewing angle property and does not change the image at the front viewing angle, the transmittance axes of the second and third polarizing plates 50 and 60 are disposed to be parallel to each other.

The first liquid crystal panel 10 may have an in-plane switching (IPS) mode or a vertical alignment (VA) mode such that the transmission axes of the first and second polarizing plates 30 and 50 are disposed to be perpendicular to each other for a black.

Since the transmission axes the first and second polarizing plates 30 and 50 of the first liquid crystal panel 10 are perpendicular to each other and the transmission axes of the second and third polarizing plates 50 and 60 of the second liquid crystal panel are parallel to each other, the first and second liquid crystal panels 10 and 20 are independently formed and the switchable LCD device requires at least three polarizing plates.

As a result, since the switchable LCD device includes four substrates and three polarizing plates, a thickness of the switchable LCD device increases and a structure of the switchable LCD device is complicated. Further, with an added process for the second liquid crystal panel 20, a fabrication process of the switchable LCD device is complicated and a fabrication cost of the switchable LCD device increases.

BRIEF SUMMARY

Embodiments relate to a switchable electroluminescent display device, e.g., a liquid crystal display device, having a light weight and a thin profile where a viewing angle adjusting panel is formed by using a liquid crystal capsule having an optical isotropy and a number of substrates and polarizing plates.

One or more embodiments relate to a switchable liquid crystal display device having a light weight and a thin profile where a fabrication process is simplified and a fabrication cost is reduced.

Advantages and features of the disclosure will be set forth in part in the description, which follows and in part will become apparent to those having ordinary skill in the art upon examination of the following or may be learned from practicing the disclosure. Other advantages and features of the embodiments herein may be realized and attained by the structure particularly pointed out in the written description and claims hereof as well as the appended drawings.

It is to be understood that both the foregoing general description and the following detailed description are explanatory, and are intended to provide further explanation of the embodiments as claimed.

BRIEF DESCRIPTION OF THE SEVERAL VIEWS OF THE DRAWINGS

The accompanying drawings, which are included to provide a further understanding of the disclosure, are incorporated in and constitute a part of this specification, illustrate implementations of the disclosure and together with the description serve to explain the principles of embodiments of the disclosure.

FIGS. 4A and 4B are perspective view showing a narrow viewing angle mode and a wide viewing angle mode, respectively, of a switchable liquid crystal display device according to a third embodiment of the present disclosure.

DETAILED DESCRIPTION

Figure 1A:
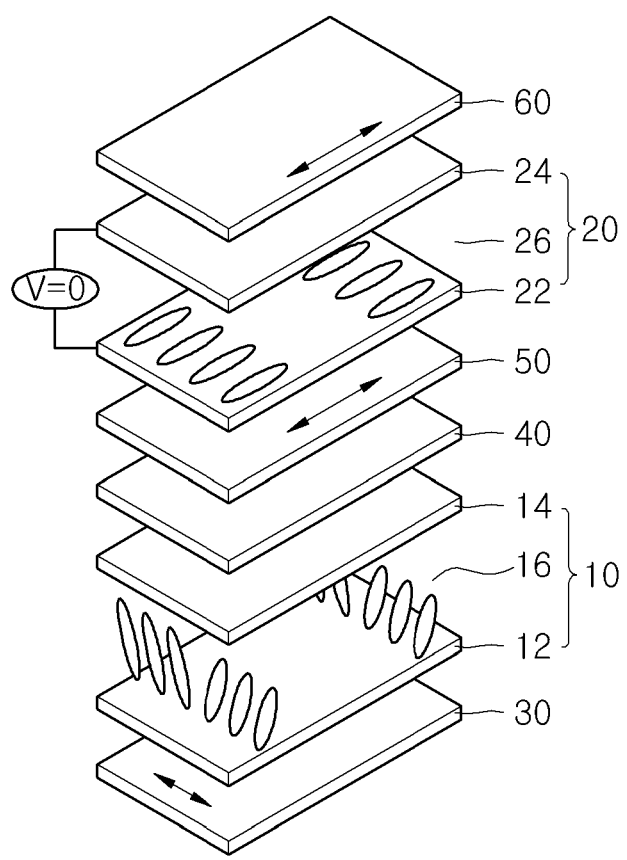
FIGS. 1A and 1B are perspective view showing a wide viewing angle mode and a narrow viewing angle mode, respectively, of a switchable liquid crystal display device according to the related art.
Figure 1B:
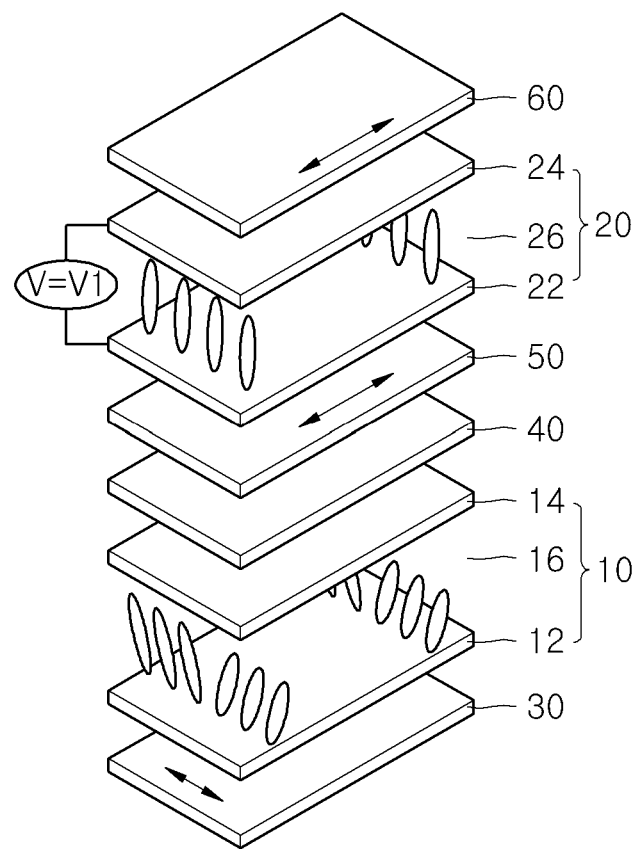

Reference will now be made in detail to embodiments of the present disclosure, examples of which are illustrated in the accompanying drawings. In the following description, when a detailed description of well-known functions or configurations related to this document is determined to unnecessarily cloud a gist of an embodiment of the disclosure, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of description and may be thus different from those used in actual products.

In a switchable liquid crystal display (LCD) device according to first to fourth embodiments of the present disclosure, a liquid crystal molecule in a liquid crystal capsule is vertically aligned in a narrow viewing angle mode and is randomly aligned in a wide viewing angle mode, controllable based on an electrical potential/field applied to the liquid crystal molecules.

A liquid crystal capsule layer may be formed on a substrate through coating and drying steps of a solution including the liquid crystal capsule. An initial state of the liquid crystal molecule in the liquid crystal capsule may be determined to be a random alignment or a vertical alignment by controlling a refractive index along an x-axis, a y-axis and a z-axis of the liquid crystal capsule. Differently from a fabrication process of a liquid crystal display device including a related art liquid crystal such as a twisted nematic (TN) liquid crystal, steps of forming an alignment layer, dispensing a liquid crystal and attaching substrates may be omitted in a fabrication process of the switchable LCD device according to the first to fourth embodiments of the present disclosure.

In addition, the liquid crystal molecule in the liquid crystal capsule may have a positive type where a long axis of the liquid crystal molecule is aligned to be parallel to a direction of an electric field or a negative type where a long axis of the liquid crystal molecule is aligned to be perpendicular to a direction of an electric field.

As a result, a vertical (with respect to an image displaying panel) alignment of the liquid crystal molecule of a narrow viewing angle mode may be obtained by not applying a voltage or by applying a strong voltage (depending on the arrangement of electrical field and the type of liquid crystal molecule), and a random alignment of the liquid crystal molecule of a wide viewing angle mode may be obtained by not applying a voltage or by applying a weak voltage (depending on the arrangement of electrical field and the type of liquid crystal molecule).

It should be appreciated that in the description herein with respect to the elements of the display devices, terms like vertical, horizontal, inner, outer, etc., may be used to described the relative positions between and among the various elements and should be construed only with respect to such relative relationship.

For example, the liquid crystal molecule of the liquid crystal capsule may be randomly aligned by applying a weak voltage (V=V1) in the first embodiment (FIG. 2B) and the fourth embodiment (FIG. 5B), and the liquid crystal molecule of the liquid crystal capsule may be vertically aligned by applying a strong voltage (V=V2) in the second embodiment (FIG. 3A) and the third embodiment (FIG. 4A).

The factor determining the voltage (the weak voltage or the strong voltage) relates to an image at a front viewing angle and a side viewing angle.

Since the liquid crystal capsule maintains an optical isotropy at the front viewing angle and/or the side viewing angle, a polarization state obtained by a lower image displaying panel may not be broken.

Differently from the related art liquid crystal such as a twisted nematic (TN) liquid crystal, the liquid crystal capsule may include the liquid crystal molecule randomly aligned in a specific state (e.g., an initial state or a weak voltage applying state). When the liquid crystal molecule of the liquid crystal capsule is randomly aligned, the liquid crystal capsule may have an optical isotropy at a front viewing angle and a side viewing angle according to a refractive index anisotropy of the liquid crystal molecule, and an incident light along the front viewing angle and the side viewing angle may have the same retardation to obtain a wide viewing angle.

Figure 3A:
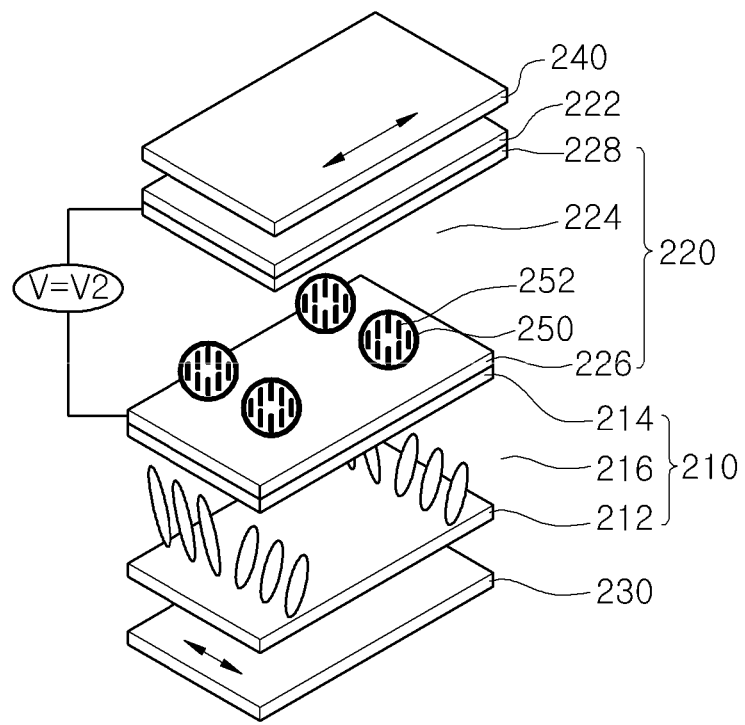
FIGS. 3A and 3B are perspective view showing a narrow viewing angle mode and a wide viewing angle mode, respectively, of a switchable liquid crystal display device according to a second embodiment of the present disclosure.

In the second embodiment of FIG. 3A and the third embodiment of FIG. 4A, since the liquid crystal molecule of the liquid crystal capsule is vertically aligned so that the liquid crystal capsule can have an optical isotropy only at the front viewing angle, a strong voltage may be required. It should be appreciated that in the description here, vertical alignment of the liquid crystals is used as an illustrative example of controlling the light transmission direction through the optical isotropy of the liquid crystal molecules. With an electrical field(s) generated in different angles (e.g., with respect to the image displaying panel), it is possible that the liquid crystal molecules are aligned uniformly in a direction (angle) different than a vertical direction. It is also possible that a display device may control the direction of the created electrical field(s) to control the alignment direction of the liquid crystals and thus the light transmission direction. Therefore, the narrow viewing angle may be controllable to be from various directions to the display device, not just a front viewing angle (which corresponding to a vertical alignment of the liquid crystals).

Figure 2A:
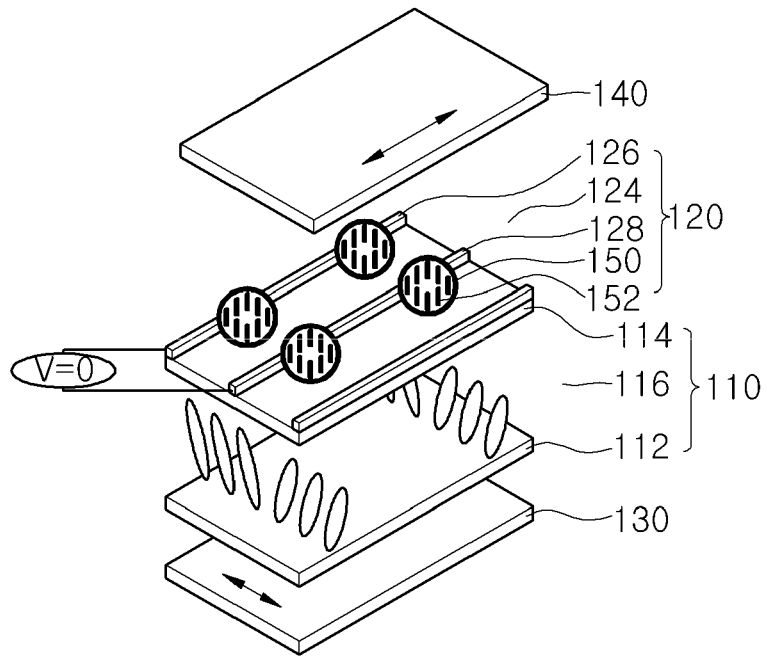
FIGS. 2A and 2B are perspective view showing a narrow viewing angle mode and a wide viewing angle mode, respectively, of a switchable liquid crystal display device according to a first embodiment of the present disclosure.
Figure 2B:
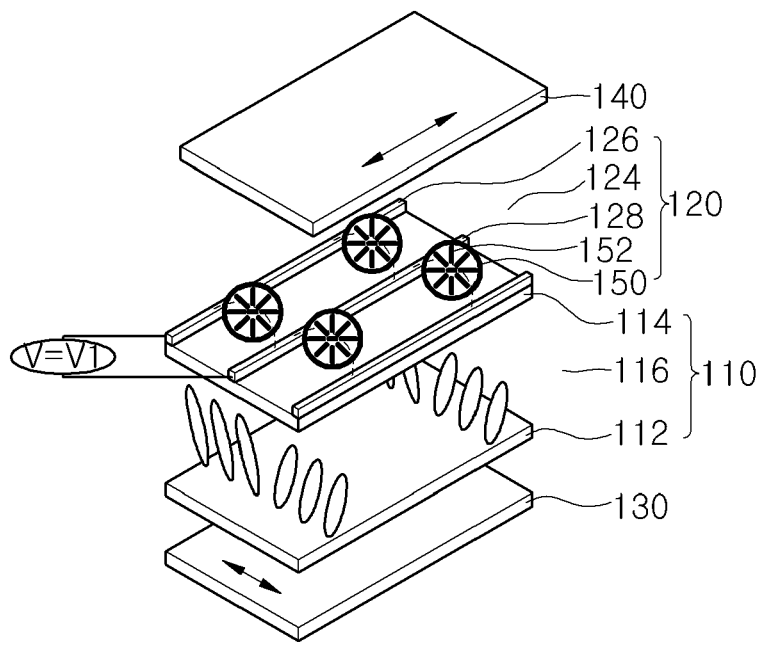
Figure 5A:
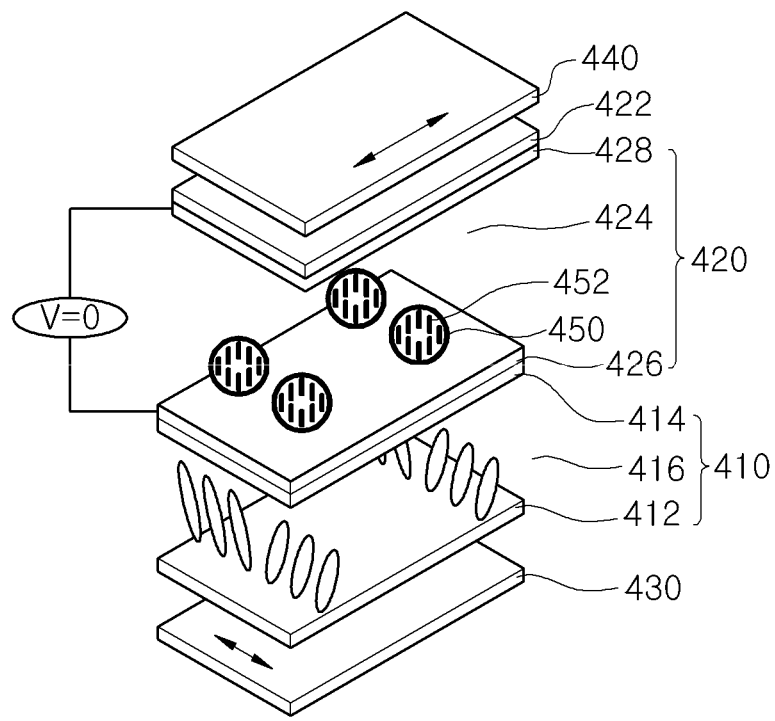
FIGS. 5A and 5B are perspective view showing a narrow viewing angle mode and a wide viewing angle mode, respectively, of a switchable liquid crystal display device according to a fourth embodiment of the present disclosure.
Figure 5B:
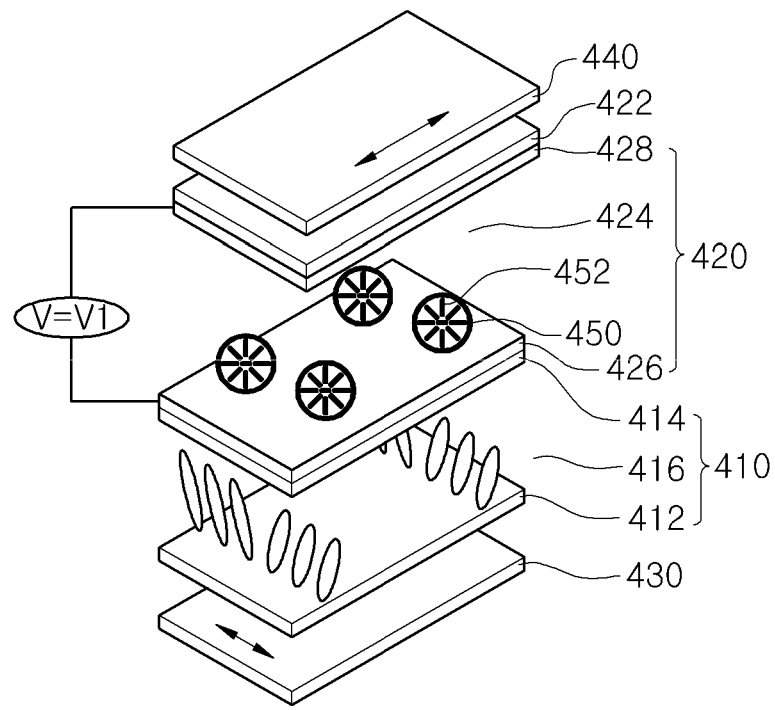

In the first embodiment of FIG. 2B and the fourth embodiment of FIG. 5B, when the liquid crystal molecule of the liquid crystal capsule is completely horizontally aligned by applying a strong voltage, a retardation may be generated at the front viewing angle as well as the side viewing angle, and the image from the lower image displaying panel may be scattered.

As a result, for the liquid crystal capsule to have the optical isotropy at the front viewing angle and the side viewing angle, the liquid crystal molecule having the vertical alignment is realigned to have the random alignment where the vertical alignment and the horizontal alignment coexist by a weak electric field (a weak voltage smaller than a threshold voltage (Vth)).

An equation of the threshold voltage (Vth) for an in-plane switching (IPS) mode for determining the weak voltage is expressed as follows:

$$V_{th} = \pi \left(\frac{l}{d}\right) \sqrt{\frac{K_{22}}{\epsilon_0 \Delta \epsilon}}$$

where l is a distance between electrodes, d is a thickness of a liquid crystal layer, K is an elastic coefficient of a liquid crystal molecule, and $\epsilon_0$ is a dielectric constant of a liquid crystal molecule.

Although the liquid crystal layer of the liquid crystal panel 110, 210, 310 and 410 (FIGS. 2A to 5B), as examples, has a vertical alignment (VA) mode in the first to fourth embodiments, the liquid crystal layer of the liquid crystal panel 110, 210, 310 and 410 may have one of a twisted nematic (TN) mode, an electrically controlled birefringence (ECB) mode, an optically compensated birefringence (OCB) mode, an in-plane switching (IPS) mode and a fringe field switching (FFS) mode, or any other modes, which are each and all included in the disclosure.

FIGS. 2A and 2B are perspective views showing a narrow viewing angle mode and a wide viewing angle mode, respectively, of a switchable liquid crystal display device 100 according to a first embodiment of the present disclosure.

In FIGS. 2A and 2B, a switchable liquid crystal display (LCD) device 100 according to a first embodiment of the present disclosure may include an image displaying panel 110, a viewing angle adjusting panel 120, and first and second polarizing plates 130 and 140.

The image displaying panel 110 may include first and second substrates 112 and 114 facing and spaced apart from one another and a liquid crystal layer 116 between the first and second substrates 112 and 114, and the viewing angle adjusting panel 120 may include multiple electrodes including first and second electrodes 126 and 128 coplanar with one another on a surface, here, e.g., on an outer surface of the second substrate 114 and a liquid crystal capsule layer 124 on or between/among the first and second electrodes 126 and 128. Each of the first and second electrodes 126 and 128 may have a bar shape, and the first and second electrodes 126 and 128 may be spaced apart from one another to be parallel one another. As such an electrical filed created between the first and second electrodes 126 and 128 may be substantially parallel to one or both of first and second polarizing plates 130 and 140. The liquid crystal capsule layer 124 may include a plurality of liquid crystal capsules 150 and a binder surrounding and supporting the plurality of liquid crystal capsules 150. Each of the plurality of liquid crystal capsules 150 may include a plurality of liquid crystal molecules 152.

Each of the plurality of liquid crystal capsules 150 may be a polymer capsule having a diameter of 1 nanometer to 999 nanometers and may be formed of various liquid crystals including, but not limited to a positive nematic liquid crystal or a negative nematic liquid crystal. The plurality of liquid crystal molecules 152 may be a positive nematic liquid crystal, a ferroelectric liquid crystal (FLC) or a flexo electric liquid crystal. Here for illustrative example, the plurality of liquid crystal molecules 152 is a positive nematic liquid crystal; the viewing angle adjusting panel 120 may easily control a viewing angle.

The liquid crystal capsule layer 124 may be formed on the outer surface of the second substrate 114 through a coating method.

In FIG. 2A, when a voltage applied to the first and second electrodes 126, 128 does not meet a threshold voltage, e.g., a voltage is not applied (V=0) to the first and second electrodes 126 and 128 of the viewing angle adjusting panel 120 of the switchable LCD device according to the first embodiment of the present disclosure, the liquid crystal molecule 152 in the liquid crystal capsule 150 may be vertically aligned to be perpendicular to the second substrate 114, and the liquid crystal capsule layer 124 may have an optical isotropy only at a front viewing angle to obtain a narrow viewing angle mode.

Among a light of a wide viewing angle emitted from the image displaying panel 110, a light incident to the viewing angle adjusting panel 120 along a front viewing angle may intactly pass through the viewing angle adjusting panel 120.

Further, among the light of a wide viewing angle emitted from the image displaying panel 110, a light incident to the viewing angle adjusting panel 120 along a side viewing angle may have a retardation and have a polarization state. Since a polarization axis of the light is not parallel to a transmission axis of the second polarizing plate 140, a transmittance through the second polarizing plate 140 may change and the viewing angle adjusting panel 120 may obtain the narrow viewing angle mode.

As a result, since the image of the polarization state from the image displaying panel 110 along the front viewing angle does not have a retardation through the viewing angle adjusting panel 120, the image passes through the second polarizing plate 140 to be shown to a user at the front viewing angle.

On the other hand, since the image of the polarization state from the image displaying panel 110 along the side viewing angle (upper, lower, right and left viewing angles) obliquely enters a long axis of the liquid crystal molecule 152 in the liquid crystal capsule 150 to have a retardation through the viewing angle adjusting panel 120, the transmittance changes through the second polarizing plate 140 and the image is shown as a dark image to a user at the side viewing angle.

Accordingly, the user at the front viewing angle may watch the content of the image displaying panel 110, while the user at the side viewing angle may not watch the content shown in the image displaying panel 110.

When the long axis of the liquid crystal molecule 152 in the liquid crystal capsule 150 of the viewing angle adjusting panel 120 is vertically aligned to be perpendicular to the second substrate 114, the switchable LCD device 100 operates in the narrow viewing angle mode.

In FIG. 2B, when a voltage that meets a threshold voltage, e.g., a voltage similar to the threshold voltage Vth (or substantially the same as the threshold voltage Vth) is applied (V=V1) to the first and second electrodes 126 and 128 of the viewing angle adjusting panel 120 of the switchable LCD device according to the first embodiment of the present disclosure, the liquid crystal molecule 152 in the liquid crystal capsule 150 may be randomly aligned, and the liquid crystal capsule layer 124 may have an optical isotropy at the front viewing angle and the side viewing angle to obtain a wide viewing angle mode.

Among a light of a wide viewing angle emitted from the image displaying panel 110, a light incident to the viewing angle adjusting panel 120 along the front viewing angle and the side viewing angle may intactly pass through the viewing angle adjusting panel 120.

Since the liquid crystal capsule layer 124 of the viewing angle adjusting panel 120 has an optical isotropy at the front viewing angle, the image of the polarization state from the image displaying panel 110 along the front viewing angle does not have a retardation through the viewing angle adjusting panel 120, and the image passes through the second polarizing plate 140 to be shown to a user at the front viewing angle.

Further, since the liquid crystal capsule layer 124 of the viewing angle adjusting panel 120 has an optical isotropy at the side viewing angle, the image of the polarization state from the image displaying panel 110 along the side viewing angle (upper, lower, right and left viewing angles) does not have a retardation through the viewing angle adjusting panel 120, and the image passes through the second polarizing plate 140 to be shown to a user at the side viewing angle.

As a result, both of the users at the front viewing angle and the side viewing angle may watch the content shown on the image displaying panel 110.

When the long axis of the liquid crystal molecule 152 in the liquid crystal capsule 150 of the viewing angle adjusting panel 120 is randomly aligned, the switchable LCD device operates in the wide viewing angle mode.

Figure 3B:
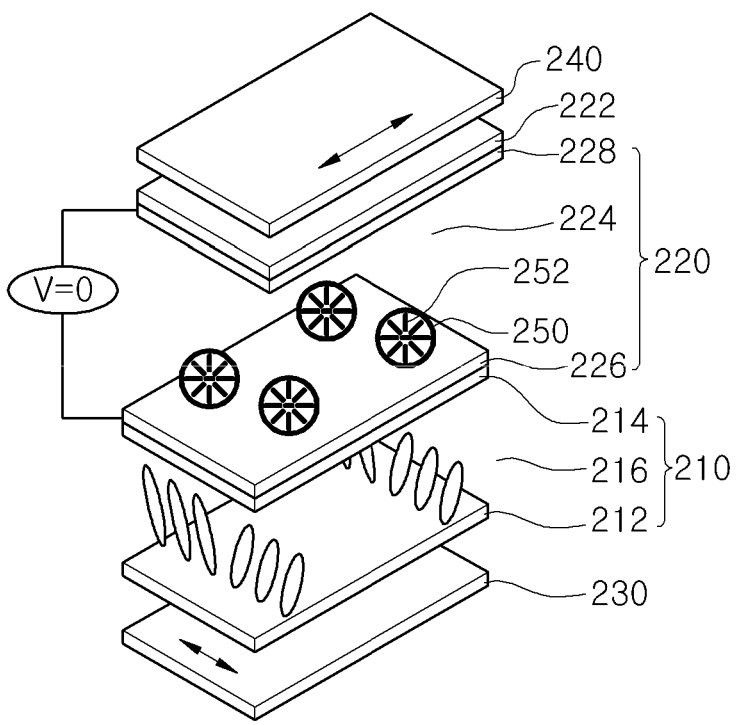

FIGS. 3A and 3B are perspective view showing a narrow viewing angle mode and a wide viewing angle mode, respectively, of a switchable liquid crystal display device 200 according to a second embodiment of the present disclosure.

In FIGS. 3A and 3B, a switchable liquid crystal display (LCD) device 200 according to a second embodiment of the present disclosure may include an image displaying panel 210, a viewing angle adjusting panel 220, and first and second polarizing plates 230 and 240.

The image displaying panel 210 may include first and second substrates 212 and 214 facing and spaced apart from one another and a liquid crystal layer 216 between the first and second substrates 212 and 214, and the viewing angle adjusting panel 220 may include a first electrode 226 on an outer surface of the second substrate 214, a liquid crystal capsule layer 224 on the first electrode 226, a third substrate 222 on the liquid crystal capsule layer 224 and a second electrode 228 on an inner surface (with respect to the LCD device 200) of the third substrate 222. Each of the first and second electrodes 226 and 228 may have a plate shape. Therefore, an electrical filed created by the first and second electrodes 226 and 228 may include a direction perpendicular to at least one of the first and second polarizing plates 230 and 240. The liquid crystal capsule layer 224 may include a plurality of liquid crystal capsules 250 and a binder (not shown for simplicity) surrounding and supporting the plurality of liquid crystal capsules 250. Each of the plurality of liquid crystal capsules 250 may include a plurality of liquid crystal molecules 252.

Each of the plurality of liquid crystal capsules 250 may be a polymer capsule having a diameter of 1 nanometer to 999 nanometers and may be formed of various liquid crystals including, but not limited to, a positive nematic liquid crystal or a negative nematic liquid crystal. The plurality of liquid crystal molecules 252 may be a positive nematic liquid crystal, a ferroelectric liquid crystal (FLC) or a flexo electric liquid crystal. For example, the plurality of liquid crystal molecules 252 is the positive nematic liquid crystal, and the viewing angle adjusting panel 220 may easily control a viewing angle.

The liquid crystal capsule layer 224 may be formed on the outer surface of the second substrate 214 through a coating method.

In FIG. 3A, when a voltage greater than a threshold voltage Vth is applied (V=V2) to the first and second electrodes 226 and 228 of the viewing angle adjusting panel 220 of the switchable LCD device 200 according to the second embodiment of the present disclosure, the liquid crystal molecule 252 in the liquid crystal capsule 250 may be vertically aligned to be perpendicular to the second substrate 214, and the liquid crystal capsule layer 224 may have an optical isotropy only at a front viewing angle to obtain a narrow viewing angle mode.

Among a light of a wide viewing angle emitted from the image displaying panel 210, a light incident to the viewing angle adjusting panel 220 along a front viewing angle may intactly pass through the viewing angle adjusting panel 220.

Further, among the light of a wide viewing angle emitted from the image displaying panel 210, a light incident to the viewing angle adjusting panel 220 along a side viewing angle may have a retardation and have a polarization state. Since a polarization axis of the light is not parallel to a transmission axis of the second polarizing plate 240, a transmittance through the second polarizing plate 240 may change and the viewing angle adjusting panel 220 may obtain the narrow viewing angle mode.

As a result, since the image of the polarization state from the image displaying panel 210 along the front viewing angle does not have a retardation through the viewing angle adjusting panel 220, the image passes through the second polarizing plate 240 to be shown to a user at the front viewing angle.

On the other hand, since the image of the polarization state from the image displaying panel 210 along the side viewing angle (upper, lower, right and left viewing angles) obliquely enters a long axis of the liquid crystal molecule 252 in the liquid crystal capsule 250 to have a retardation through the viewing angle adjusting panel 220, the transmittance changes through the second polarizing plate 240 and the image is shown as a dark image to a user at the side viewing angle.

Accordingly, the user at the front viewing angle may see the content of the image displaying panel 210, while the user at the side viewing angle may not see the content shown on the image displaying panel 210.

When the long axis of the liquid crystal molecule 252 in the liquid crystal capsule 250 of the viewing angle adjusting panel 220 is vertically aligned to be perpendicular to the second substrate 214, the switchable LCD device operates in the narrow viewing angle mode.

In FIG. 3B, when a voltage applied to the first and second electrodes 226 and 228 does not meet a threshold voltage, e.g., a voltage is not applied (V=0) to the first and second electrodes 226 and 228 of the viewing angle adjusting panel 220 of the switchable LCD device 200 according to the second embodiment of the present disclosure, the liquid crystal molecule 252 in the liquid crystal capsule 250 may be randomly aligned, and the liquid crystal capsule layer 224 may have an optical isotropy at the front viewing angle and the side viewing angle to obtain a wide viewing angle mode.

Among a light of a wide viewing angle emitted from the image displaying panel 210, a light incident to the viewing angle adjusting panel 220 along the front viewing angle and the side viewing angle may intactly pass through the viewing angle adjusting panel 220.

Since the liquid crystal capsule layer 224 of the viewing angle adjusting panel 220 has an optical isotropy at the front viewing angle, the image of the polarization state from the image displaying panel 210 along the front viewing angle does not have a retardation through the viewing angle adjusting panel 220, and the image passes through the second polarizing plate 240 to be shown to a user at the front viewing angle.

Further, since the liquid crystal capsule layer 224 of the viewing angle adjusting panel 220 has an optical isotropy at the side viewing angle, the image of the polarization state from the image displaying panel 210 along the side viewing angle (upper, lower, right and left viewing angles) does not have a retardation through the viewing angle adjusting panel 220, and the image passes through the second polarizing plate 240 to be shown to a user at the side viewing angle.

As a result, both of the users at the front viewing angle and the side viewing angle may see the content shown on the image displaying panel 210.

When the long axis of the liquid crystal molecule 252 in the liquid crystal capsule 250 of the viewing angle adjusting panel 220 is randomly aligned, the switchable LCD device operates in the wide viewing angle mode.

FIGS. 4A and 4B are perspective view showing a narrow viewing angle mode and a wide viewing angle mode, respectively, of a switchable liquid crystal display device 300 according to a third embodiment of the present disclosure.

In FIGS. 4A and 4B, a switchable liquid crystal display (LCD) device 300 according to a third embodiment of the present disclosure may include an image displaying panel 310, a viewing angle adjusting panel 320, and first and second polarizing plates 330 and 340.

The image displaying panel 310 may include first and second substrates 312 and 314 facing and spaced apart from one another and a liquid crystal layer 316 between the first and second substrates 312 and 314, and the viewing angle adjusting panel 320 may include multiple electrodes including, but not limited to, first and second electrode 326 and 328 over an outer surface (with respect to the LCD device 300) of the second substrate 314 and a liquid crystal capsule layer 324 on the first and second electrodes 326 and 328. Each of the first and second electrodes 326 and 328 may have a bar shape, and the first and second electrodes 326 and 328 may be spaced apart from one another to be parallel to one another and coplanar to one another over second substrate 314. The liquid crystal capsule layer 324 may include a plurality of liquid crystal capsules 350 and a binder (not shown for simplicity) surrounding and supporting the plurality of liquid crystal capsules 350. Each of the plurality of liquid crystal capsules 350 may include a plurality of liquid crystal molecules 352.

Each of the plurality of liquid crystal capsules 350 may be a polymer capsule having a diameter of 1 nanometer to 999 nanometers and may be formed of various liquid crystals including, but not limited to, a positive nematic liquid crystal or a negative nematic liquid crystal. The plurality of liquid crystal molecules 352 may be a negative nematic liquid crystal, a ferroelectric liquid crystal (FLC) or a flexo electric liquid crystal. For example, the plurality of liquid crystal molecules 352 is the negative nematic liquid crystal, and the viewing angle adjusting panel 320 may easily control a viewing angle.

The liquid crystal capsule layer 324 may be formed on the outer surface of the second substrate 314 through a coating method.

In FIG. 4A, when a voltage greater than a threshold voltage Vth is applied (V=V2) to the first and second electrodes 326 and 328 of the viewing angle adjusting panel 320 of the switchable LCD device 300 according to the third embodiment of the present disclosure, the liquid crystal molecule 352 in the liquid crystal capsule 350 may be vertically aligned to be perpendicular to the second substrate 314, and the liquid crystal capsule layer 324 may have an optical isotropy only at a front viewing angle to obtain a narrow viewing angle mode.

Among a light of a wide viewing angle emitted from the image displaying panel 310, a light incident to the viewing angle adjusting panel 320 along a front viewing angle may intactly pass through the viewing angle adjusting panel 320.

Further, among the light of a wide viewing angle emitted from the image displaying panel 310, a light incident to the viewing angle adjusting panel 320 along a side viewing angle may have a retardation and have a polarization state. Since a polarization axis of the light is not parallel to a transmission axis of the second polarizing plate 340, a transmittance through the second polarizing plate 340 may change and the viewing angle adjusting panel 320 may obtain the narrow viewing angle mode.

As a result, since the image of the polarization state from the image displaying panel 310 along the front viewing angle does not have a retardation through the viewing angle adjusting panel 320, the image passes through the second polarizing plate 340 to be shown to a user at the front viewing angle.

On the other hand, since the image of the polarization state from the image displaying panel 310 along the side viewing angle (upper, lower, right and left viewing angles) obliquely enters a long axis of the liquid crystal molecule 352 in the liquid crystal capsule 350 to have a retardation through the viewing angle adjusting panel 320, the second polarizing plate 340 absorbs the light and the image is shown as a dark image to a user at the side viewing angle.

Accordingly, the user at the front viewing angle may see the content shown on the image displaying panel 310, while the user at the side viewing angle may not see the content shown on the image displaying panel 310.

When the long axis of the liquid crystal molecule 352 in the liquid crystal capsule 350 of the viewing angle adjusting panel 320 is vertically aligned to be perpendicular to the second substrate 314, the switchable LCD device operates in the narrow viewing angle mode.

In FIG. 4B, when a voltage applied to the first and second electrodes 326 and 328 does not meet a threshold voltage, e.g., a voltage is not applied (V=0) to the first and second electrodes 326 and 328 of the viewing angle adjusting panel 320 of the switchable LCD device 300 according to the third embodiment of the present disclosure, the liquid crystal molecule 352 in the liquid crystal capsule 350 may be randomly aligned, and the liquid crystal capsule layer 324 may have an optical isotropy at the front viewing angle and the side viewing angle to obtain a wide viewing angle mode.

Among a light of a wide viewing angle emitted from the image displaying panel 310, a light incident to the viewing angle adjusting panel 320 along the front viewing angle and the side viewing angle may intactly pass through the viewing angle adjusting panel 320.

Since the liquid crystal capsule layer 324 of the viewing angle adjusting panel 320 has an optical isotropy at the front viewing angle, the image of the polarization state from the image displaying panel 310 along the front viewing angle does not have a retardation through the viewing angle adjusting panel 320, and the image passes through the second polarizing plate 340 to be shown to a user at the front viewing angle.

Further, since the liquid crystal capsule layer 324 of the viewing angle adjusting panel 320 has an optical isotropy at the side viewing angle, the image of the polarization state from the image displaying panel 310 along the side viewing angle (upper, lower, right and left viewing angles) does not have a retardation through the viewing angle adjusting panel 320, and the image passes through the second polarizing plate 340 to be shown to a user at the side viewing angle.

As a result, both of the users at the front viewing angle and the side viewing angle may see the content shown on the image displaying panel 310.

When the long axis of the liquid crystal molecule 352 in the liquid crystal capsule 350 of the viewing angle adjusting panel 320 is randomly aligned, the switchable LCD device operates in the wide viewing angle mode.

FIGS. 5A and 5B are perspective views showing a narrow viewing angle mode and a wide viewing angle mode, respectively, of a switchable liquid crystal display device 400 according to a fourth embodiment of the present disclosure.

In FIGS. 5A and 5B, a switchable liquid crystal display (LCD) device 400 according to a fourth embodiment of the present disclosure may include an image displaying panel 410, a viewing angle adjusting panel 420, and first and second polarizing plates 430 and 440.

The image displaying panel 410 may include first and second substrates 412 and 414 facing and spaced apart from one another and a liquid crystal layer 416 between the first and second substrates 412 and 414, and the viewing angle adjusting panel 420 may include a first electrode 426 on an outer surface (with respect to LCD device 400) of the second substrate 414, a liquid crystal capsule layer 424 on the first electrode 426, a third substrate 422 on the liquid crystal capsule layer 424 and a second electrode 428 on an inner surface (with respect to LCD device 400) of the third substrate 422. Each of the first and second electrodes 426 and 428 may have a plate shape. The liquid crystal capsule layer 424 may include a plurality of liquid crystal capsules 450 and a binder (not shown for simplicity) surrounding and supporting the plurality of liquid crystal capsules 450. Each of the plurality of liquid crystal capsules 450 may include a plurality of liquid crystal molecules 452.

Each of the plurality of liquid crystal capsules 450 may be a polymer capsule having a diameter of 1 nanometer to 999 nanometers and may be formed of various liquid crystals including, but not limited to, a positive nematic liquid crystal or a negative nematic liquid crystal. The plurality of liquid crystal molecules 452 may be a negative nematic liquid crystal, a ferroelectric liquid crystal (FLC) or a flexo electric liquid crystal. For example, the plurality of liquid crystal molecules 452 is the negative nematic liquid crystal, and the viewing angle adjusting panel 420 may easily control a viewing angle.

The liquid crystal capsule layer 424 may be formed on the outer surface of the second substrate 414 through a coating method.

In FIG. 5A, when a voltage applied to the first and second electrodes 426 and 428 does not meet a threshold voltage, e.g., a voltage is not applied (V=0) to the first and second electrodes 426 and 428 of the viewing angle adjusting panel 420 of the switchable LCD device 400 according to the fourth embodiment of the present disclosure, the liquid crystal molecule 452 in the liquid crystal capsule 450 may be vertically aligned to be perpendicular to the second substrate 414, and the liquid crystal capsule layer 424 may have an optical isotropy only at a front viewing angle to obtain a narrow viewing angle mode.

Among a light of a wide viewing angle emitted from the image displaying panel 410, a light incident to the viewing angle adjusting panel 420 along a front viewing angle may intactly pass through the viewing angle adjusting panel 420.

Further, among the light of a wide viewing angle emitted from the image displaying panel 410, a light incident to the viewing angle adjusting panel 420 along a side viewing angle may have a retardation and have a polarization state. Since a polarization axis of the light is not parallel to a transmission axis of the second polarizing plate 440, a transmittance through the second polarizing plate 440 may change and the viewing angle adjusting panel 420 may obtain the narrow viewing angle mode.

As a result, since the image of the polarization state from the image displaying panel 410 along the front viewing angle does not have retardation through the viewing angle adjusting panel 420, the image passes through the second polarizing plate 440 to be shown to a user at the front viewing angle.

On the other hand, since the image of the polarization state from the image displaying panel 410 along the side viewing angle (upper, lower, right and left viewing angles) obliquely enters a long axis of the liquid crystal molecule 452 in the liquid crystal capsule 450 to have a retardation through the viewing angle adjusting panel 420, the transmittance changes through the second polarizing plate 440 and the image is shown as a dark image to a user at the side viewing angle.

Accordingly, the user at the front viewing angle may see the content shown on the image displaying panel 410, while the user at the side viewing angle may not see the content shown on the image displaying panel 410.

When the long axis of the liquid crystal molecule 452 in the liquid crystal capsule 450 of the viewing angle adjusting panel 420 is vertically aligned to be perpendicular to the second substrate 414, the switchable LCD device operates in the narrow viewing angle mode.

In FIG. 5B, when a voltage similar to a threshold voltage Vth (substantially the same as the threshold voltage Vth) is applied (V=V1) to the first and second electrodes 426 and 428 of the viewing angle adjusting panel 420 of the switchable LCD device 400 according to the fourth embodiment of the present disclosure, the liquid crystal molecule 452 in the liquid crystal capsule 450 may be randomly aligned, and the liquid crystal capsule layer 424 may have an optical isotropy at the front viewing angle and the side viewing angle to obtain a wide viewing angle mode.

Among a light of a wide viewing angle emitted from the image displaying panel 410, a light incident to the viewing angle adjusting panel 420 along the front viewing angle and the side viewing angle may intactly pass through the viewing angle adjusting panel 420.

Since the liquid crystal capsule layer 424 of the viewing angle adjusting panel 420 has an optical isotropy at the front viewing angle, the image of the polarization state from the image displaying panel 410 along the front viewing angle does not have a retardation through the viewing angle adjusting panel 420, and the image passes through the second polarizing plate 440 to be shown to a user at the front viewing angle.

Further, since the liquid crystal capsule layer 424 of the viewing angle adjusting panel 420 has an optical isotropy at the side viewing angle, the image of the polarization state from the image displaying panel 410 along the side viewing angle (upper, lower, right and left viewing angles) does not have a retardation through the viewing angle adjusting panel 420, and the image passes through the second polarizing plate 440 to be shown to a user at the side viewing angle.

As a result, both of the users at the front viewing angle and the side viewing angle may see the content shown on the image displaying panel 410.

When the long axis of the liquid crystal molecule 452 in the liquid crystal capsule 450 of the viewing angle adjusting panel 420 is randomly aligned, the switchable LCD device operates in the wide viewing angle mode.

When a voltage is not applied as an initial state (or a voltage smaller than a threshold voltage is applied), the liquid crystal molecule is vertically aligned in the liquid crystal capsule of the switchable LCD device 100, 300 according to the first and fourth embodiments of the present disclosure. When a voltage is not applied as an initial state (or a voltage smaller than a threshold voltage is applied), the liquid crystal molecule is randomly aligned in the liquid crystal capsule of the switchable LCD device 200, 400 according to the second and third embodiments of the present disclosure.

An alignment of the initial state of the liquid crystal molecule in the liquid crystal capsule may be determined by a refractive index of the liquid crystal capsule layer.

Figure 6:
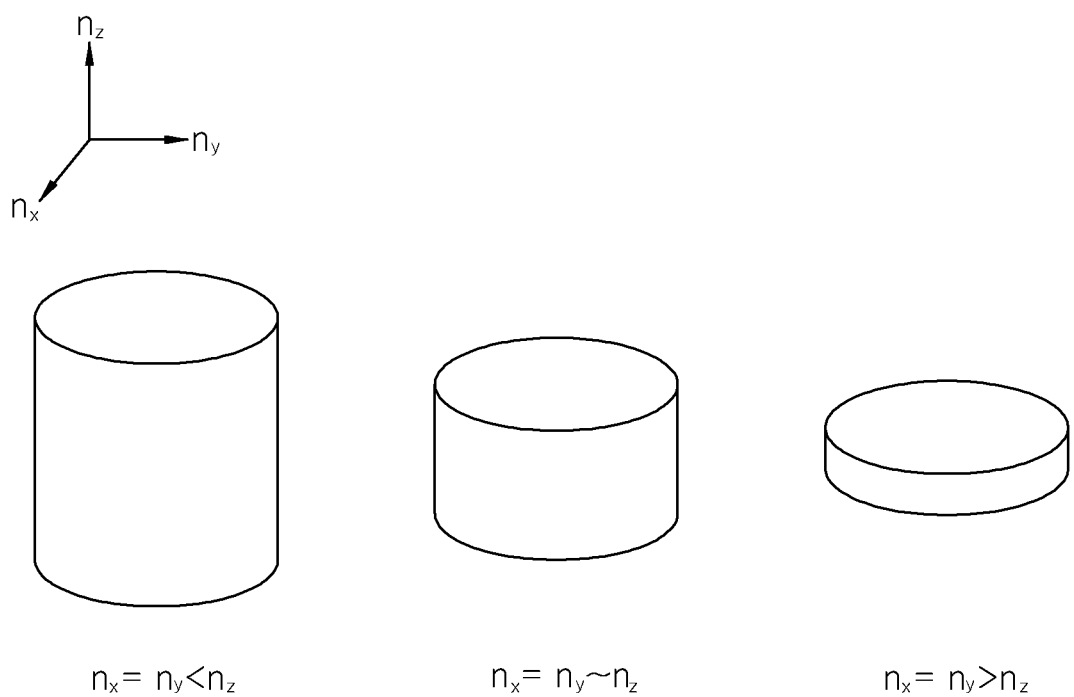
FIG. 6 is a view showing a refractive index of a liquid crystal capsule layer of a switchable liquid crystal display device according to the first to fourth embodiments of the present disclosure.

FIG. 6 is a view showing a refractive index of a liquid crystal capsule layer of a switchable liquid crystal display device according to first to fourth embodiments of the present disclosure.

In FIG. 6, refractive indexes along an x-axis, a y-axis and a z-axis of a liquid crystal capsule layer may have various values. The x-axis and the y-axis are axes forming a plane where the liquid crystal capsule layer is disposed, and the z-axis is an axis corresponding to a thickness of the liquid crystal capsule layer.

In the liquid crystal capsule layer, the x-axis refractive index (Nx) and the y-axis refractive index (Ny) may be the same as one another (Nx=Ny), and the z-axis refractive index (Nz) may be greater than each of the x-axis refractive index (Nx) and the y-axis refractive index (Ny) (Nz>Ny) as shown in the left drawing of FIG. 6. Alternatively, the x-axis refractive (Nx) index and the y-axis refractive index (Ny) may be the same as one another (Nx=Ny), and the z-axis refractive index (Nz) may be similar to each of the x-axis refractive index (Nx) and the y-axis refractive index (Ny) (Nz~Ny) as shown in the middle drawing of FIG. 6. Alternatively, the x-axis refractive index (Nx) and the y-axis refractive index (Ny) may be the same as one another (Nx=Ny), and the z-axis refractive index (Nz) may be smaller than each of the x-axis refractive index (Nx) and the y-axis refractive index (Ny) (Nz<Ny) as shown in the right drawing of FIG. 6.

The retardation (Rth) along the thickness direction of the liquid crystal capsule layer is defined as follows:

$$Rth=(Nz-Ny)*d,$$

where Nz is a refractive index along a z-axis of a liquid crystal capsule layer, Ny is a refractive index along a y-axis of a liquid crystal capsule layer, and d is a thickness of a liquid crystal capsule layer.

For example, when the retardation (Rth) along the thickness direction has a relatively great value as in the left drawing of FIG. 6 (Nx=Ny<Nz), most of the plurality of liquid crystal molecules in the liquid crystal capsule may be vertically aligned to be perpendicular to the substrate. As a result, the liquid crystal molecule of the left drawing of FIG. 6 may be used for the narrow viewing angle mode of the switchable LCD device according to the first and fourth embodiments of the present disclosure.

When the retardation (Rth) along the thickness direction has a relatively small value as in the middle drawing of FIG. 6 (Nx=Ny~Nz), most of the plurality of liquid crystal molecules in the liquid crystal capsule may be randomly aligned. As a result, the liquid crystal molecule of the middle drawing of FIG. 6 may be used for the wide viewing angle mode of the switchable LCD device according to the second and third embodiments of the present disclosure.

Accordingly, the liquid crystal capsule layer formed to have a relatively great retardation may be used for the switchable LCD device according to the first and fourth embodiments of the present disclosure, and the liquid crystal capsule layer formed to have a relatively small retardation (i.e., nearly 0) may be used for the switchable LCD device according to the second and third embodiments of the present disclosure.

Consequently, in the switchable LCD device according to the present disclosure, since the viewing angle adjusting panel is formed by using the liquid crystal capsule layer having the optical isotropy, the number of the substrates and the polarizing plates are reduced and the weight and the volume of the switchable LCD device are reduced to obtain the light weight and the thin profile.

In addition, since the liquid crystal capsule layer of the viewing angle adjusting panel is formed through the coating method, the steps of coating the alignment layer, rubbing the alignment layer, attaching the substrates and injecting the liquid crystal material are omitted, the fabrication process of the switchable LCD device is simplified, and the fabrication cost of the switchable LCD device is reduced.

Although the description herein uses a switchable LCD device as an example of an electroluminescent display device, it should be appreciated that the methods and structures of the disclosure, e.g., the liquid crystal capsule layer, the electrode bars, electrode plates, the polarizing plates and may be used with other electroluminescent display devices like an organic light emitting diode (OLED) related display devices to achieve the functions of switching viewing angles, which are included in the disclosure A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A liquid crystal display device, comprising:
an image displaying panel;
a viewing angle adjusting panel including a liquid crystal capsule layer over the image displaying panel, the liquid crystal capsule layer including a plurality of discrete liquid crystal capsules, the plurality of discrete liquid crystal capsules each being separated from one another, and each of the plurality of discrete liquid crystal capsules including a polymer capsule and a plurality of liquid crystal molecules within the polymer capsule;
a first polarizing plate below the image displaying panel; and
a second polarizing plate over the viewing angle adjusting panel,
wherein the liquid crystal display device operates in one of a narrow viewing angle mode and a wide viewing angle mode, and
wherein the plurality of discrete liquid crystal molecules are vertically aligned in the narrow viewing angle mode and are randomly aligned in the wide viewing angle mode.

2. The device of claim 1, wherein the image displaying panel comprises:
first and second substrates facing and spaced apart from one another; and
a liquid crystal layer between the first and second substrates.

3. The device of claim 2, wherein the viewing angle adjusting panel further comprises a first electrode and a second electrode disposed coplanar with one another on a surface over the second substrate.

4. The device of claim 3, wherein each of the first and second electrodes has a bar shape, and the first and second electrodes are spaced apart from one another and are parallel to one another.

5. The device of claim 3, wherein the plurality of liquid crystal molecules each have a positive type, and
wherein the plurality of liquid crystal molecules are vertically aligned in a case that a voltage applied to the first and second electrodes does not meet a threshold voltage, and
wherein the plurality of liquid crystal molecules are randomly aligned in a case that the voltage applied to the first and second electrodes meets a threshold voltage.

6. The device of claim 3, wherein the plurality of liquid crystal molecules each have a negative type,
wherein the plurality of liquid crystal molecules are randomly aligned in a case that a voltage applied to the first and second electrodes does not meet a threshold voltage, and
wherein the plurality of liquid crystal molecules are vertically aligned in a case that a voltage greater than a threshold voltage is applied to the first and second electrodes.

7. The device of claim 2, wherein the viewing angle adjusting panel further comprises:
a first electrode between the second substrate and the liquid crystal capsule layer;
a third substrate between the liquid crystal capsule layer and the second polarizing plate; and
a second electrode between the third substrate and the liquid crystal capsule layer.

8. The device of claim 7, wherein each of the first and second electrodes has a plate shape.

9. The device of claim 7, wherein the plurality of liquid crystal molecules each have a positive type,
wherein the plurality of liquid crystal molecules are randomly aligned in a case that a voltage applied to the first and second electrodes does not meet a threshold voltage, and
wherein the plurality of liquid crystal molecules are vertically aligned in a case that a voltage greater than a threshold voltage is applied to the first and second electrodes.

10. The device of claim 7, wherein the plurality of liquid crystal molecules each have a negative type,
wherein the plurality of liquid crystal molecules are vertically aligned in a case that a voltage applied to the first and second electrodes does not meet a threshold voltage, and wherein the plurality of liquid crystal molecules are randomly aligned in a case that a voltage applied to the first and second electrodes meets a threshold voltage.

11. The device of claim 1, wherein the image displaying panel is at least one of an in-plane switching mode liquid crystal panel, a fringe field switching mode liquid crystal panel, a vertical alignment mode liquid crystal panel, an electrically controlled birefringence mode liquid crystal panel and an optically compensated birefringence mode liquid crystal panel.

12. The device of claim 1, wherein transmission axes of the first and second polarizing plates are perpendicular to one another.

13. The device of claim 1, wherein a refractive index along a y-axis of the liquid crystal capsule layer is smaller than a refractive index along a z-axis of the liquid crystal capsule layer, and the plurality of liquid crystal molecules are vertically aligned without application of a voltage.

14. The device of claim 1, wherein the refractive index along a y-axis of the liquid crystal capsule layer is similar to a refractive index along a z-axis of the liquid crystal capsule layer, and the plurality of liquid crystal molecules are randomly aligned without application of a voltage.

* * * * *